United States Patent
Bong (10) Patent No.: US 12,386,197 B2
(45) Date of Patent: Aug. 12, 2025

(54) KIT FOR OPHTHALMOLOGY AND METHOD OF USE THEREOF

(71) Applicant: I-Avenue Pte. Ltd., Singapore (SG)

(72) Inventor: Boon Hwee Bong, Singapore (SG)

(73) Assignee: I-Avenue Pte. Ltd., Singapore (SG)

( * ) Notice: Subject to any disclaimer, the term of this patent is extended or adjusted under 35 U.S.C. 154(b) by 186 days.

(21) Appl. No.: 18/214,203

(22) Filed: Jun. 26, 2023

(65) Prior Publication Data
US 2024/0427171 A1   Dec. 26, 2024

(51) Int. Cl.
*G02C 3/00*     (2006.01)
(52) U.S. Cl.
CPC ..................................... *G02C 3/00* (2013.01)
(58) Field of Classification Search
None
See application file for complete search history.

(56) References Cited

U.S. PATENT DOCUMENTS

| | | |
|---|---|---|
| 7,883,205 B2 | 2/2011 | Begg |
| 9,625,741 B1 | 4/2017 | Tammaro |
| 2022/0066242 A1* | 3/2022 | Leonardo ................ G02C 7/16 |

* cited by examiner

*Primary Examiner* — Darryl J Collins
(74) *Attorney, Agent, or Firm* — Preston Smirman; SMIRMAN IP LAW, PLLC (57) ABSTRACT

A kit for ophthalmology and method of use thereof. The kit includes a set of vision alignment modules for adhering to at least one vision component of an eyewear, and a set of mounting modules for attaching to the vision component. The set of vision alignment modules are removably adhered to the vision component in a way to locate pupils of a user along the vision component, and locate locations along the vision component where the mounting modules are to be attached thereto before the vision alignment modules are removed from the vision component. The kit further includes a set of lens modules that are to be mounted onto the vision component via the mounting modules.

19 Claims, 11 Drawing Sheets

KIT FOR OPHTHALMOLOGY AND METHOD OF USE THEREOF

FIELD OF THE INVENTION

The invention relates generally to the field of ophthalmology. More specifically, a kit for ophthalmology and its method of use is described, which intends to provide and enable vision correction for a broad range of eyewear in a compatible manner.

BACKGROUND OF THE INVENTION

In the modern era, eye disorders have become commonplace within the populace, and hence, it is of utmost importance that means of support are provided to people plagued with eye disorders so that they may carry on with their lives without vision impairment.

Eye disorders may be broadly categorised into three categories, which include myopia, where light entering the eye is focused in front of the retina; hyperopia, where light entering the eye is focused to the back of the retina; and astigmatism, where light entering the eye is unable to be focused to a single point.

Existing solutions for overcoming eye disorders include going to a medical facility or visiting an optician to obtain a vision-correction apparatus, such as a pair of spectacles. However, it is to be noted that these solutions are inflexible and may cause grievances to their vision-impaired users. Firstly, the price of obtaining a vision correction apparatus is high, and they cannot be disassembled after being manufactured. Secondly, the vision correction apparatus cannot be shared across other eye wearables (e.g., protective masks, ski goggles, swimming goggles, sunglasses, virtual reality equipment, etc.). Thirdly, the user would face difficulties in customising the vision correction apparatus, for example, its colour or its shape.

Among disclosed technologies over the prior art that may relate to ophthalmologic devices that seek to improve the applicability of vision-correction means across multiple eyewear includes U.S. Pat. No. 9,625,741, which discloses clip-on lens assembly designed to be attached to existing eyeglasses. The assembly includes one or more clip-on lenses that can be easily positioned and removed from a top of the eyeglass lenses. The clip-on lens has mounting clips at the top, which are used to securely attach the clip-on lens to the eyeglasses. These mounting clips consist of a base that is fixedly attached to the clip-on lens and a flexible portion that extends outward. The flexible portion can be flexed or moved outward to create an opening, allowing the eyeglasses to fit through. Once the opening is created, the flexible portion engages or makes contact with the eyeglasses, effectively mounting the clip-on lens onto them.

Yet another disclosed technology includes U.S. Pat. No. 7,883,205, which discloses a lens-retaining structure that is mountable on top of a pair of glasses. The structure consists of an inner portion and an outer portion, both made of a flexible and resilient material with a predefined resting position. The inner portion has an inner lens grabber, while the outer portion has an outer lens grabber. These grabbers are designed to engage with specific features on a lens. When the inner and outer portions are in their resting positions, they are separated by a certain distance. This design allows the lens retaining structure to hold lenses with different dimensions and shapes by adjusting the positions of the inner and outer lens grabbers accordingly.

It is noted that the attempts made by the aforementioned disclosed technologies are unable to properly address the grievances of the vision-impaired populace, as they remain rigid, inflexible, and inapplicable to a broad range of eyewear.

Accordingly, it is desirable to have a kit for ophthalmology and its method of use that intends to provide and enable vision correction with a broad range of eyewear in a compatible manner with consideration of its re-configurability and customisability. Preferably, the kit and its method of use shall further enable an optical centre of a vision-corrective means to be aligned with the eye pupils of a user.

SUMMARY OF THE INVENTION

An objective of the present invention is to provide a kit for ophthalmology and its method of use to provide and enable vision correction for a broad range of eyewear in a compatible manner. The kit comprises a set of vision alignment modules, a set of mounting modules, and a set of lens modules. The articles of the kit are to interact, based on its method of use, for the lens module to be detachably mounted on a vision component of an eyewear. In particular, the kit and its method of use shall further enable an optical centre of the lens module to be aligned to the eye pupils of the user.

Advantageously, the present invention provides and enables vision correction for a broad range of eyewear in a compatible manner. Advantageously as well, the present invention provides and enables vision correction with a degree of customisability and reconfigurability, whereby a same set of lens modules may be used across multiple eyewear that is installed with mounting modules. Advantageously as well, since the optical centre of a lens module is aligned to the pupils of the user, this ensures maximum viewability of the user through the lens module.

The present invention intends to provide a kit for ophthalmology, comprising a set of vision alignment modules for adhering to at least one vision component of an eyewear, and a set of mounting modules for attaching to the vision component. The set of vision alignment modules are removably adhered to the vision component in a way to align eye pupils distance of a user onto the vision component, and to determine locations on the vision component where the mounting modules are to be attached thereto before the vision alignment modules are removed from the vision component.

Preferably, any or each of the vision alignment modules comprises a first locator for locating one pupil of the user along the vision component as the eyewear is worn, a second locator for locating a first location along the vision component where one mounting module is to be attached thereto, and a third locator, for locating a second location along the vision component where one mounting module is to be attached thereto.

Preferably, any or each of the vision alignment modules further comprises a plurality of reference lines for positioning of the vision alignment module along the vision component as it adheres thereto.

Preferably, any or each of the vision alignment modules further comprises an adhesion surface to enable adherence to the vision component in a detachable manner.

Preferably, the kit further comprises a set of lens modules that are mounted onto the vision component via the mounting modules.

Preferably, any or each of the lens modules comprises a lens unit defined with one or more slots, and one or more attractor units, which are inserted into the slots to enable the lens module mounted onto the vision component via the mounting module.

Preferably, the lens modules each further comprises sleeves that sleeve the attractor units of the lens module for frictional contact between the said attractor units and the slots of the lens unit as the said attractor units are inserted into the slots.

Preferably, any or each of the mounting modules comprises a bonding layer for enabling attachment of the mounting module to the vision component via adhesion, and an attractor unit for enabling attachment of the lens module, or portions thereof, onto the mounting module for mounting of the lens module onto the vision component via the mounting module.

Preferably, any or each of the mounting modules comprises a bonding unit for enabling attachment of the mounting module to the vision component via negative pressure, and a gripper structure having a pair of attractor units for enabling attachment of the lens module, or portions thereof, onto the mounting module for mounting the lens module onto the vision component via the mounting module.

Preferably, regarding the kit, the attractor units are magnets or magnetic devices.

The present invention also intends to provide a method for ophthalmology, comprising the steps of adhering each vision alignment module from a set of vision alignment modules onto a vision component of an eyewear, and attaching each mounting module from a set of vision alignment modules onto the vision component. Any or each of the vision alignment modules adheres to the vision component in a way to locate pupils of a user along the vision component, and locate locations along the vision component where the mounting modules are to be attached thereto before the vision alignment modules are removed from the vision component.

Preferably, regarding the method, any or each of the vision alignment modules comprises a first locator, for locating one pupil of the user along the vision component as the eyewear is worn.

Preferably, the method further comprises the step of adjusting the position of each vision alignment module for the first locator to be aligned to one pupil of the user, for pupils of a user along the vision component to be located.

Preferably, regarding the method, any or each of the vision alignment modules further comprises a plurality of reference lines for positioning of the vision alignment modules as it adheres to the vision component.

Preferably, the method further comprises the step of adjusting the position of each vision alignment module for it to be aligned to a reference based on the reference lines on the vision alignment module.

Preferably, the method further comprises the step of mounting each lens module from a set of lens modules onto the vision component via the mounting modules.

Preferably, the method further comprises the step of inserting one or more attractor units into slots of a lens unit of one lens module, to enable the step of mounting each lens module from a set of lens modules onto the vision component via the mounting modules.

Preferably, the method according further comprises the steps of attaching the mounting module to the vision component, via adhesion, by a bonding layer of the mounting module, and attaching the lens module, or portions thereof, onto the mounting module by an attractor unit of the mounting module.

Preferably, the method further comprises the steps of attaching the mounting module to the vision component, via negative pressure, by a bonding unit of the mounting module, and attaching the lens module, or portions thereof, onto the mounting module by a gripper structure of the mounting module, which has a pair of attractor units.

Preferably, regarding the method, the attractor units are magnets or magnetic devices.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

To facilitate an understanding of the present invention, there is illustrated in the accompanying drawings the preferred embodiments, from an inspection of which when considered in connection with the following description, the invention, its construction and operation and many of its advantages would be readily understood and appreciated.

FIGS. 2a and 2b illustrate an example embodiment of the vision alignment module of the kit for ophthalmology. In particular, FIG. 2a illustrates its perspective view, and FIG. 2b illustrates its front view.

FIGS. 3a and 3b illustrate a mounting module of the kit for ophthalmology in its first example embodiment. In particular, FIG. 3a illustrates its perspective view, and FIG. 3b illustrates its front view.

FIGS. 4a to 4g illustrate a mounting module of the kit for ophthalmology in its second example embodiment. In particular, FIG. 4a illustrates its perspective top view, FIG. 4b illustrates its perspective bottom view, FIG. 4c illustrates its front view, FIG. 4d illustrates its left side view, FIG. 4e illustrates its right side view, FIG. 4f illustrates its top view, and FIG. 4g illustrates its bottom view.

FIGS. 5a and 5b illustrate a lens module of the kit for ophthalmology in a simple example embodiment. In particular, FIG. 5a illustrates its perspective view, and FIG. 5b illustrates its front view.

FIGS. 5c to 5e illustrate a lens module of the kit for ophthalmology in a first example embodiment. In particular, FIG. 5c illustrates its perspective view and its related sub-assemblies, FIG. 5d illustrates its front view, and FIG. 5e illustrates its cross-sectional view along the lines A-A' as shown in FIG. 5d.

FIGS. 5f to 5h illustrate a lens module of the kit for ophthalmology in a second example embodiment. In particular, FIG. 5f illustrates its perspective view and its related sub-assemblies, FIG. 5g illustrates its front view, and FIG. 5h illustrates its cross-sectional view along the lines B-B' as shown in FIG. 5g.

FIGS. 6a to 6e collectively illustrate an example method for ophthalmology carried out using the kit for ophthalmology. In particular.

DETAILED DESCRIPTION OF THE INVENTION

The present invention relates to a kit for ophthalmology and its method of use that intends to provide and enable vision correction for a broad range of eyewear in a compatible manner. The kit and its method of use further enable an optical centre of the vision-corrective means to be aligned to the pupils of the user.

The invention will now be described in greater detail, by way of example, with reference to the figures. For ease of reference, common reference numerals or series of numerals will be used throughout the figures when referring to the same or similar features common to the figures.

From hereon, it should be noted that eyewear may refer to articles, accessories, or devices that at least provide one or more vision components with eye-covering or facial-covering functionality that covers or is adjacent to either one or both eyes of a user. These articles, accessories, or devices may be, by way of example, spectacles, monocles, safety goggles, helmet visors, masks, eyepieces of a headset, or the like.

Figure 1:
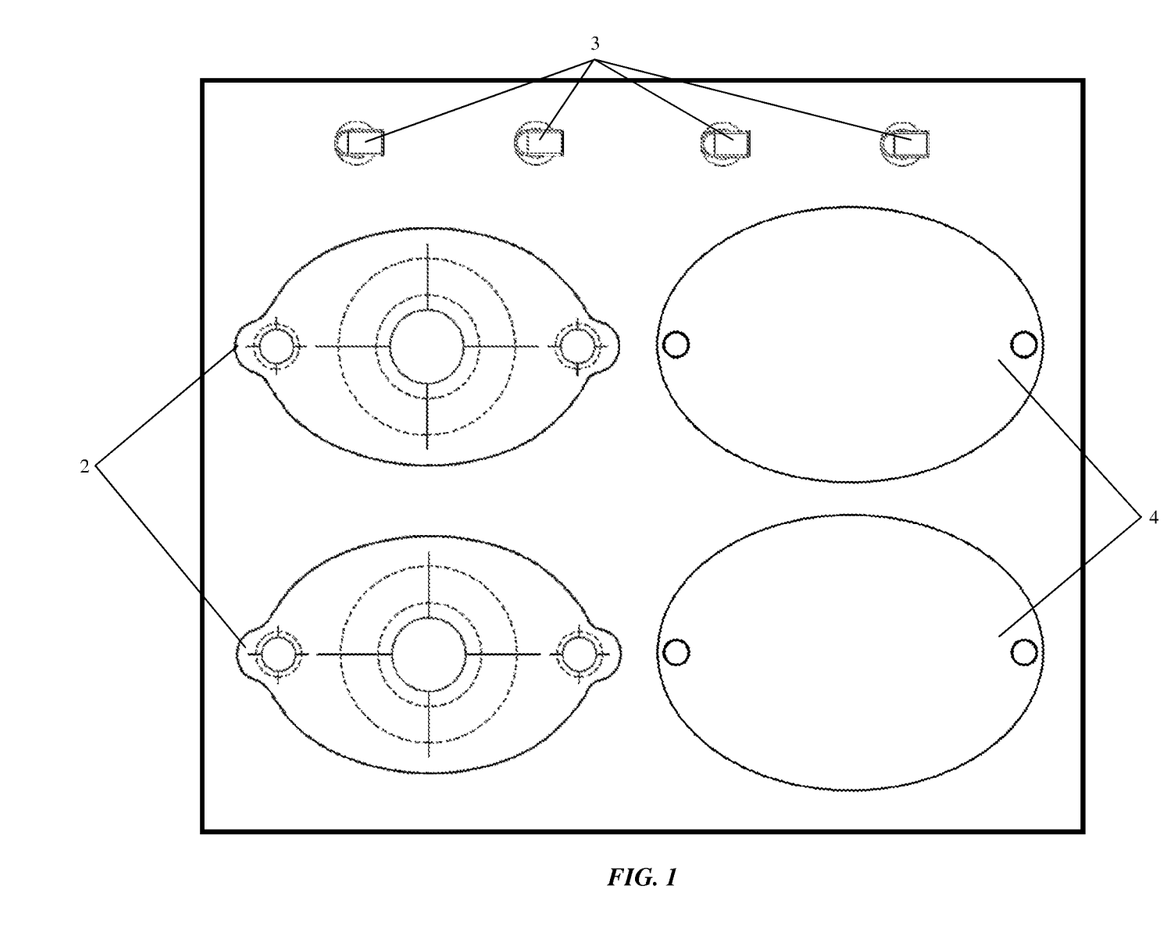
FIG. 1 illustrates an example embodiment of the kit for ophthalmology as provided by the present invention.

FIG. 1 illustrates an example embodiment of the kit for ophthalmology as provided by the present invention. As shown, the kit comprises a set of vision alignment modules 2, a set of mounting modules 3, and a set of lens modules 4. Each mounting module 3 and the lens module 4 may include one or more securing means, for the mounting modules 3 to be attached to a receiving surface of an eyewear, and for the lens modules 4 to be attached to the mounting modules 3 in a detachable manner, which enables mounting of the lens modules 4 onto the eyewear. In particular, the receiving surface of the eyewear is a vision component of the eyewear.

Figure 2A:
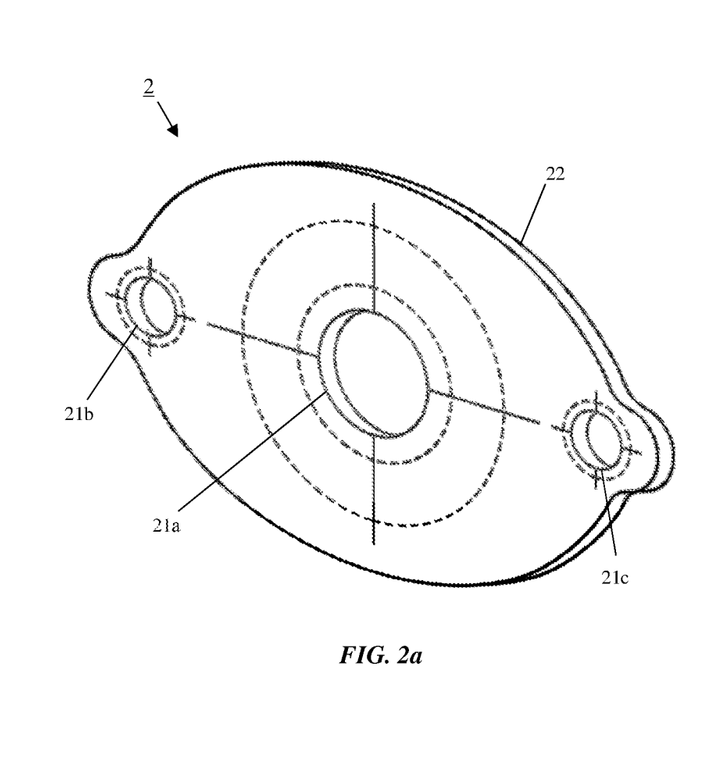
Figure 2B:
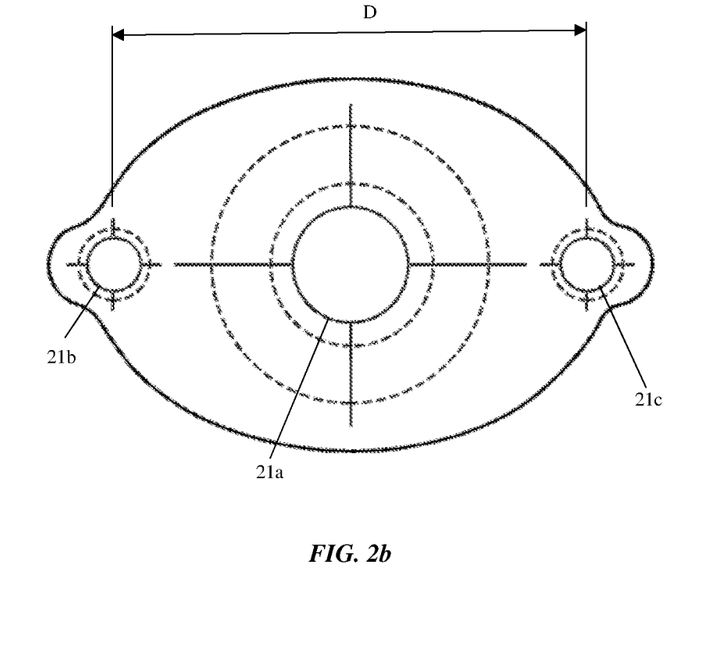

FIGS. 2a and 2b illustrate an example embodiment of the vision alignment module 2 of the kit for ophthalmology. In particular, FIG. 2a illustrates its perspective view, and FIG. 2b illustrates its front view. As shown, the vision alignment module 2 has a first surface that may correspond to the front of the vision alignment module 2, and a second surface that may correspond to the back of the vision alignment module 2. As shown, the body of the vision alignment module 2 is formed with one or more apertures that define one or more locators $21a$, $21b$, $21c$. In particular, the first surface of the vision alignment module 2 has one or more reference lines provided therealong and about each of the locators $21a$, $21b$, $21c$, while the second surface of the vision alignment module 2 is an adhesion surface 22. In one embodiment, a distance D between the locators $21b$ and $21c$ may be substantially 40 to 50 mm.

Regarding the vision alignment module 2, it has a pliable body with a degree of flexibility, such as, a film, for it to be substantially bendable so that it may conform to a receiving surface of an eyewear. Alternatively, it may also have a rigid or semi-rigid body.

Regarding the vision alignment module 2, it may be opaque or semi-transparent. Preferably, light is allowed to pass through the locators $21a$, $21b$, $21c$.

Regarding the vision alignment module 2, it has an outline that is in the shape of an elongated ellipse with protruded distal ends. However, it may be any other permissible shape that is substantively round or elliptical. The locators $21a$, $21b$, $21c$ as distributed along the vision alignment module 2 in such a way that a first locator $21a$ is located at a symmetrical centre of the vision alignment module 2, a second locator $21b$ is located adjacently and/or in the vicinity of a first distal end of the vision alignment module 2, and a third locator $21c$ is located adjacently and/or in the vicinity of a second distal end of the vision alignment module 2.

Regarding the vision alignment module 2, the first locator $21a$ is to locate a position along the receiving surface of the eyewear whereby the line of sight of a user passes therethough as the user wears the eyewear, with the position preferably being aligned to a pupil of the user. As for the second locator $21b$ and the third locator $21c$, they are to locate positions along the receiving surface of the eyewear in which mounting modules 3 are to be attached. More specifically, the second locator $21b$ locates a first location along the vision component where one mounting module is to be attached thereto, and the third locator $21c$ locates a second location along the vision component where one mounting module is to be attached thereto.

Regarding the vision alignment module 2, the reference lines provided at its first surface about each of the locators $21a$, $21b$, $21c$ to enable proper positioning of the vision alignment module 2 along the receiving surface of the eyewear. These reference lines may be in the form of a combination of circles that encircle the locators $21a$, $21b$, $21c$ and perpendicular lines that cross through an imaginary centre of the locators $21a$, $21b$, $21c$. These reference lines may be printed, embedded, coated, painted, or layered upon the first surface.

Regarding the vision alignment module 2, the adhesion surface 22 at its second surface substantially covers the entirety of the second surface, and it is to allow the vision alignment module 2 to adhere to a receiving surface of the eyewear. Preferably, the adhesion surface 22 provides temporary adherence to a surface for enabling a removability of the vision alignment module 2, and it may be, by way of example, a pressure-sensitive adhesive surface, a self-adhesive surface of low-viscosity, a layer of adhesive, or the like. Preferably as well, the adhesion surface 22 also allows the vision alignment module 2 to move slidably and adjacently to the receiving surface of the eyewear while still being substantially adhered to it.

Figure 3A:
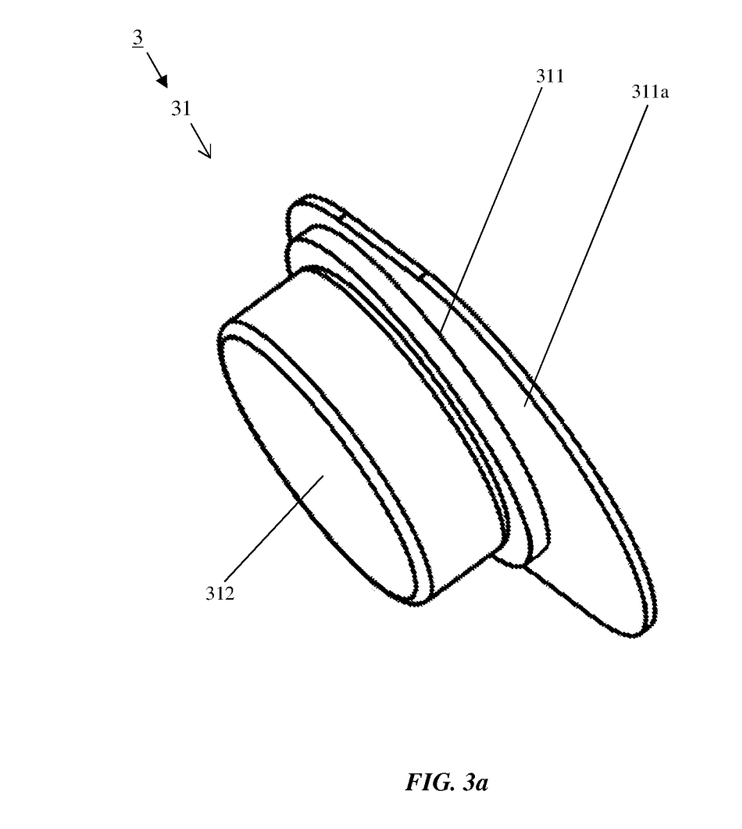
Figure 3B:
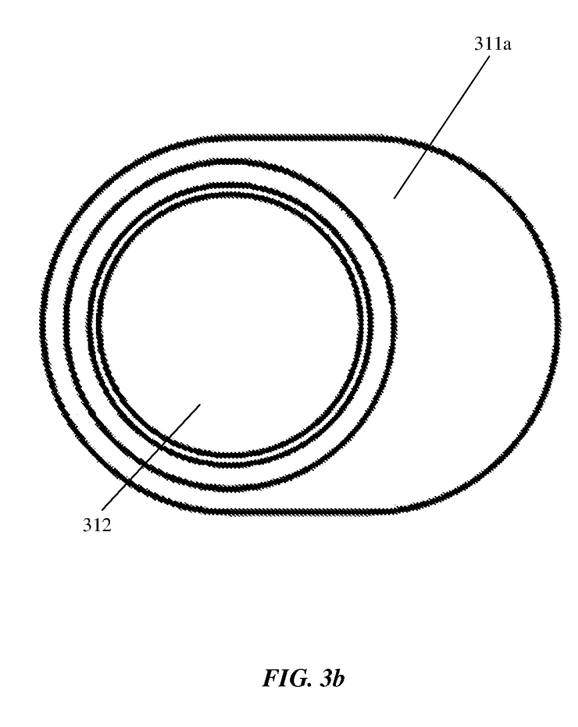

FIGS. 3a and 3b illustrate a mounting module 3 of the kit for ophthalmology in its first example embodiment 31. In particular, FIG. 3a illustrates its perspective view, and FIG. 3b illustrates its front view. As shown, the mounting module 3 in its first example embodiment 31 comprises one or more securing means for it to facilitate the mounting of a lens module onto the receiving surface of the eyewear, with its including a bonding layer 311 covered with a release film $311a$, and an attractor unit 312.

Regarding mounting module 3 in its first example embodiment 31, it has a substantially cylindrical body with its bonding layer 311 and attractor unit 312 disposed at opposing ends. The bonding layer 311 enables this first example embodiment 31 to attach to the receiving surface of the eyewear in a semi-permanent or permanent manner upon removal of its release film $311a$. The bonding layer 311 may be a self-adhesive surface of high viscosity, or the like. The attractor unit 312 enables this first example embodiment 31 to substantially be attached with a lens module in a detachable manner, and the attractor unit 312 may be in the form of a magnet or a magnetic device.

Figure 4A:
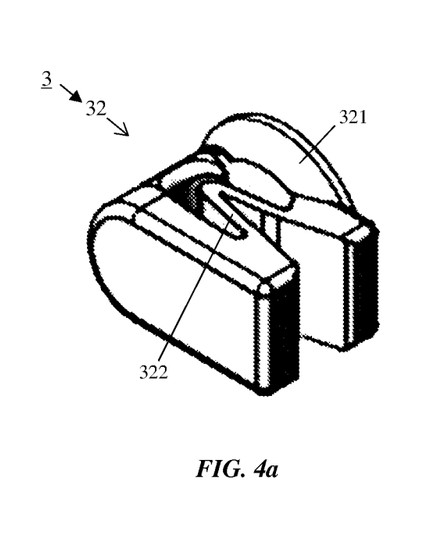
Figure 4B:
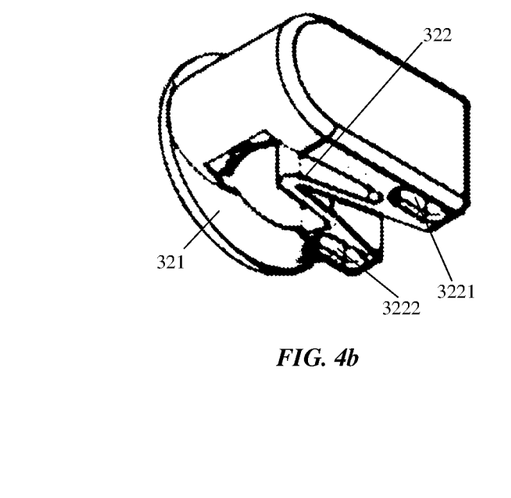

FIGS. 4a to 4g illustrate a mounting module 3 of the kit for ophthalmology in its second example embodiment 32. In particular, FIG. 4a illustrates its perspective top view, FIG.

Figure 4C:
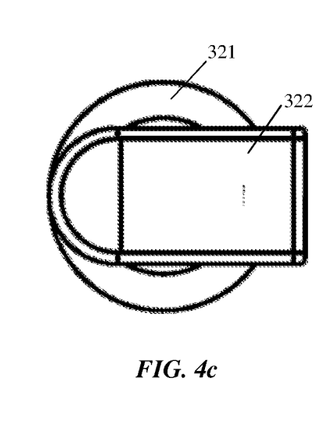
Figure 4D:
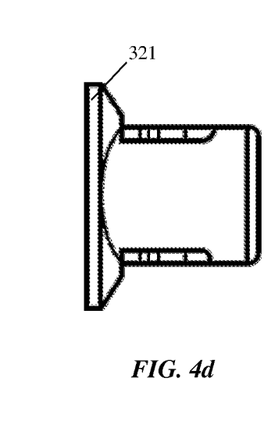
Figure 4E:
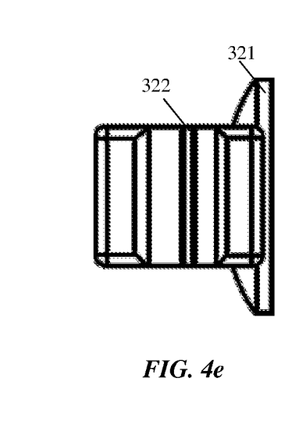
Figure 4F:
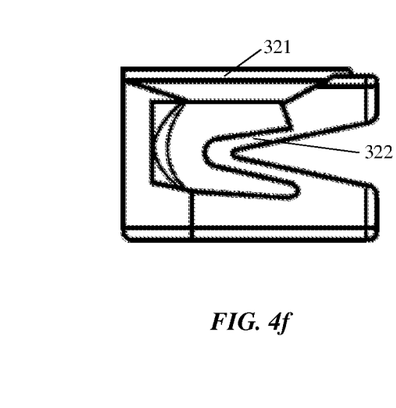
Figure 4G:
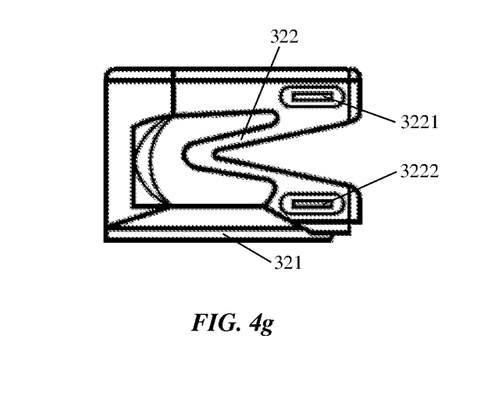

4b illustrates its perspective bottom view, FIG. 4c illustrates its front view, FIG. 4d illustrates its left side view, FIG. 4e illustrates its right side view, FIG. 4f illustrates its top view, and FIG. 4g illustrates its bottom view. As shown, the mounting module 3 in its second example embodiment 32 comprises one or more securing means for it to facilitate the mounting of a lens module onto the receiving surface of the eyewear, with its securing means including a bonding unit 321 and a gripper structure 322 disposed with one or more attractor units 3221, 3222 at its arms.

Regarding mounting module 3 in its second example embodiment 32, its body is defined by the gripper structure 322, with the bonding unit 321 positionally adjacent thereto and parallel to the orientation of its arms. In particular, the bonding unit 321 may be in the form of a suction cup, and it is to enable this second example embodiment 32 to bond to the receiving surface of the eyewear in a semi-permanent manner by means of negative pressure. The gripper structure 322, together with the attractor units 3221, 3222, is to enable this second example embodiment 32 to substantially be attached with a lens module in a detachable manner within its arms. In particular, there is a first attractor unit 3221 and a second attractor unit 3222, which may be in the form of a magnet or a magnetic device, which are disposed therein the arms of the gripper structure 322 in such a way that they substantially face each other with opposing polarities.

Figure 5A:
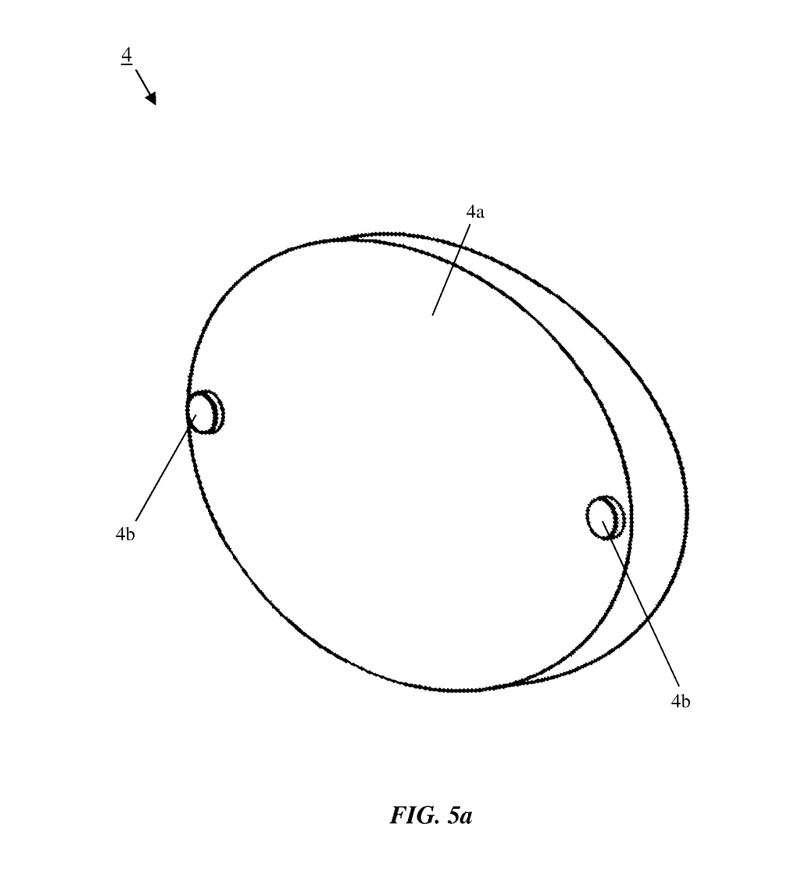
Figure 5B:
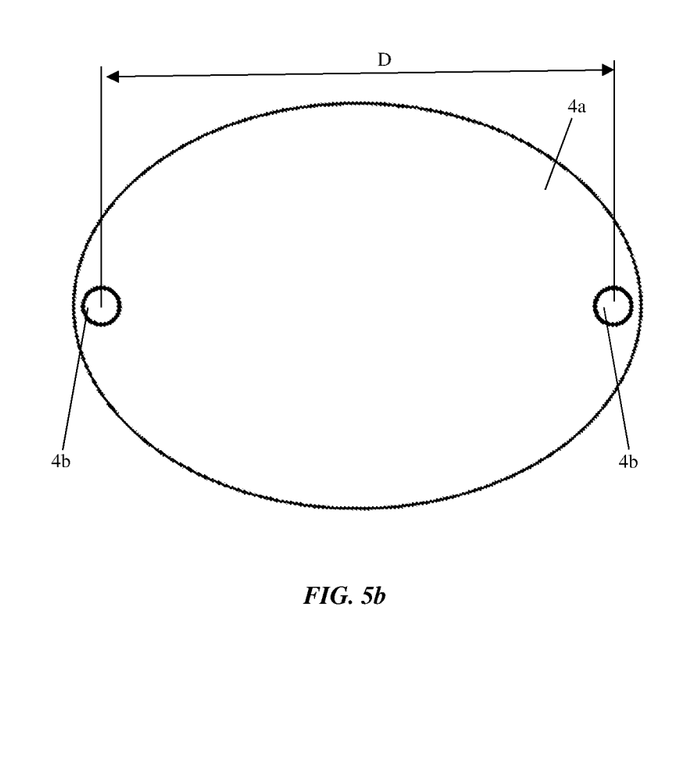

FIGS. 5a and 5b illustrate a lens module 4 of the kit for ophthalmology in a simple example embodiment. In particular, FIG. 5a illustrates its perspective view, and FIG. 5b illustrates its front view. As shown, the lens module 4 is to substantially include a lens unit 4a and one or more attractor unit 4b that facilitates its attachment onto the mounting module 3 for its mounting onto the receiving surface of the eyewear via the mounting module 3. The lens unit 4a and the attractor unit 4b may be formed as a single piece, or are separate pieces that are assemblable to form the lens module 4. Preferably, the distance D between the two attractor units 4b corresponds to the distance D between the locators 21b and 21c.

Figure 5C:
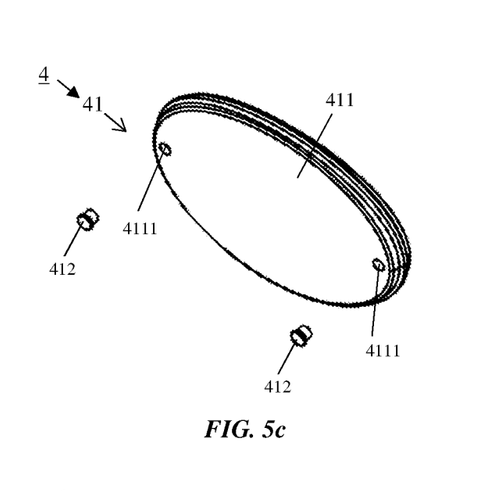
Figure 5D:
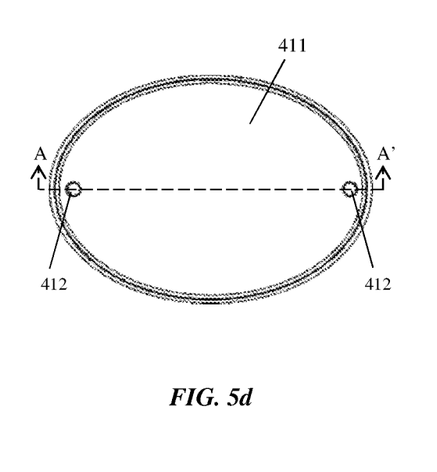
Figure 5E:
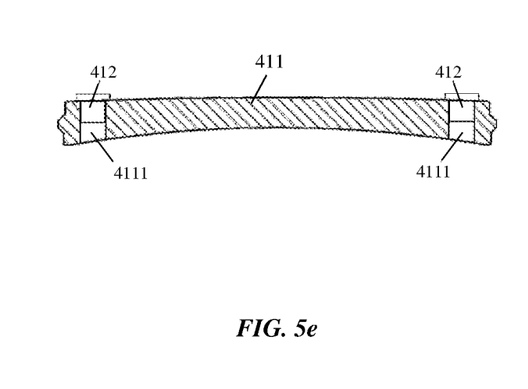

FIGS. 5c to 5e illustrate a lens module 4 of the kit for ophthalmology in a first example embodiment 41. In particular, FIG. 5c illustrates its perspective view and its related sub-assemblies, FIG. 5d illustrates its front view, and FIG. 5e illustrates its cross-sectional view along the lines A-A' as shown in FIG. 5d. As shown, the lens module 4 of this first example embodiment 41 comprises a lens unit 411 that accommodates one or more securing means that are in the form of attractor units 412 that are to facilitate its attachment onto the mounting module 3.

Regarding lens module 4 in its first example embodiment 41, and as shown in FIGS. 5c and 5d, its lens unit 411 has an overall elliptical shape. The lens unit 411 is formed with one or more apertures or contours that are adjacent to its distal ends, which define slots 4111 for enabling the accommodation of the attractor units 412. The attractor units 412 may be in the form of a magnet or a magnetic device with a substantially cylindrical body. For each attractor unit 412, they have one end that is formed with a cap for the said end to circumferentially protrude outwardly, thereby preferably giving the body a T-shaped outline. It is to be noted that the length of attractor units 412 may or may not span the entire depth of the slots 4111. It is to be noted that the body diameter of attractor units 412 may be the same size or be smaller than the opening width of the slots 4111.

Regarding lens module 4 in its first example embodiment 41, its assembly may be done by the user or in a factory, and they are to insert the cap-less end of the attractor units 412 into the slots 4111 until the capped end of the attractor units 412 is in substantial contact with the lens unit 411. As the opening size of the slots 4111 is preferably slightly smaller than the size of the cap-less end of the attractor units 412, insertion of the attractor units 412 thereinto shall allow the lens unit 411 to accommodate the attractor units 412 in a semi-permanent or permanent manner by means of an interference fit.

Figure 5F:
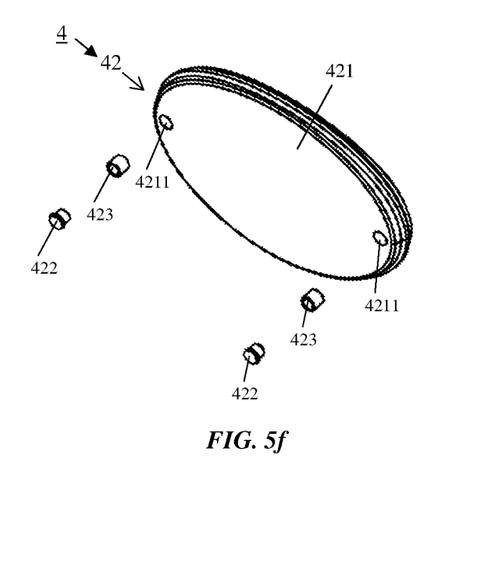
Figure 5G:
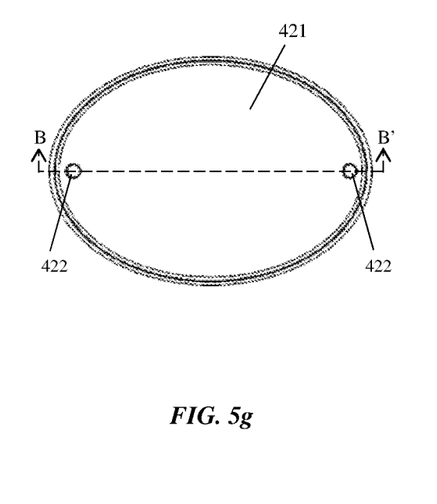
Figure 5H:
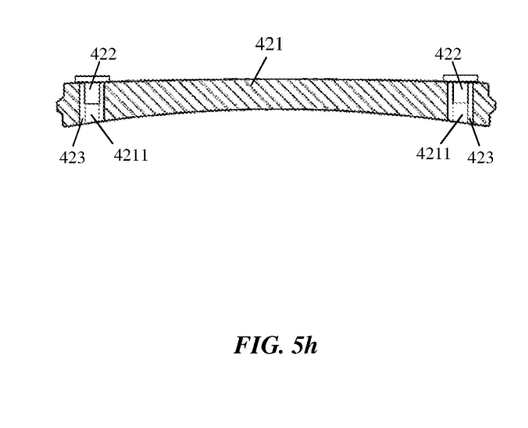

FIGS. 5f to 5h illustrate a lens module 4 of the kit for ophthalmology in a second example embodiment 42. In particular, FIG. 5f illustrates its perspective view and its related sub-assemblies, FIG. 5g illustrates its front view, and FIG. 5h illustrates its cross-sectional view along the lines B-B' as shown in FIG. 5g. As shown, the lens module 4 of this second example embodiment 42 comprises a lens unit 421 that accommodates one or more securing means that are in the form of sleeved attractor units 422 that facilitate its attachment onto the mounting module 3.

Regarding lens module 4 in its second example embodiment 42, and as shown in FIGS. 5f and 5g, its lens unit 421 has an overall elliptical shape. The lens unit 421 is formed with one or more apertures or contours at its adjacent distal ends, which define slots 4211 for enabling the accommodation of attractor units 422. The attractor units 422 may be in the form of a magnet or a magnetic device with a substantially cylindrical body. For each attractor unit 422, they have one end that is formed with a cap for the said end to circumferentially protrude outwardly, thereby preferably giving the body a T-shaped outline. It is to be noted that the length of attractor units 422 and sleeves 423 and they may or may not span the entire depth of the slots 4211. It is to be noted that the body diameter of attractor units 422 may be the same size or be smaller than the opening width of the slots 4211. Further included are the sleeves 423, which are each tightly fitted around one attractor units 422 to provide a frictional contact between the attractor unit 422 and the slot 4211. Preferably, the sleeves are in the form of elastic rubber.

Regarding lens module 4 in its second example embodiment 42, its assembly may be done by the user or in a factory, and they are to first sleeve the body of the attractor unit 422 with sleeves 423, and then insert the cap-less end of the attractor units 422 into the slots 4211 until the capped end of the attractor units 422 is in substantial contact with the lens unit 421. As the opening size of the slots 4211 is preferably larger than the size of the cap-less end of the attractor units 412, the inner diameter of the sleeves 423 is preferably smaller than the diameter of the cap-less body of the attractor units 422, and the outer diameter of the sleeves is preferably smaller than the opening of the slots 4211, insertion of the attractor units 422, being tightly sleeved, into the slots 4211 shall allow the lens unit 421 to accommodate the attractor units 422 in a semi-permanent manner by means of a friction-based interference fit. Due to the sleeve 423 having elastic properties, the sleeved attractor unit 422 may be disassembled from the lens unit 421 at will by the user, for the user to make changes according to their needs.

It is to be noted that the attractor units may of the lens module 4 may not be limited to as described, and the may have any permissible body shape, colour, and size. In one embodiment, the attractor units have a smooth cylindrical body. In yet another embodiment, the attractor units have a tapered body, giving them a V-shaped outline. Alternatively, the attactor units 412, 422 may be fixed mounted in the receiving slots 4111, 4211 by means of an adhesive, which may be cured by ultra-violet light.

It is to be noted that the slots of the lens module 4 may not be limited to as described. They may be made to have different shapes and sizes from those described, but they at least correspondingly accommodate the attractor units. In particular, they may have different widths and depths. Furthermore, they may be in the form of blind holes or through holes.

It is to be noted that the accommodation of the attractor units by the lens unit of the lens module 4 may not be limited to as described. In one embodiment, the attractor units may be accommodated within the slots of the lens module 4 using glue of high viscosity. In particular, drops of glue are dripped into the slot of the lens module before the insertion of the attractor units. As the glue solidifies, the lens unit shall accommodate the attractor units in a permanent manner. Other glue that may be cured by ultraviolet light exposure can also be used. It is possible that sizes of the lens units are predetermined, or at least distance D is predetermined, so that the attractor units 4b, 412, 422 can be mounted onto the lens unit 4, 411, 421 at a factory where mounting precision is more controllable or repeatable; a user then just need to locate positions of the eye pupils onto the vision component 11 and use the lens units with the attactor units 4b, 412,422 already mounted thereon.

It is to be noted that, the lens unit of the lens assembly 4 may be a convex lens, a concave lens, a biconvex lens, a biconcave lens, a plano-convex lens, a plano-convex lens, or the like.

FIGS. 6a to 6e collectively illustrate an example method for ophthalmology carried out using the kit for ophthalmology as described above. The example method may comprise one or more steps, and each of them may illustratively correspond to any one of FIGS. 6a to 6e. It is noted that the steps described are not to be interpreted as limiting, and minor modifications to the steps (e.g., additions, omissions, or swaps) are permissible by a skilled person without substantial deviation from as described.

Within the description of the example method, the articles of the kit are to be provided along a receiving surface of an eyewear 1, with the receiving surface being a vision component 11 of the eyewear 1. While the articles of the kit are shown to be provided along the outward-facing surface of the vision component 11, it should be noted that the articles of the kit may also be provided for use on an inward-facing surface of the vision component 11. Preferably, the attractor units 4b on the lens module 4 are spaced apart at the distance D so that the attractor units 4b do not block the user vision when looking through the vision component 11.

In a first step of the example method, the step of adhering each vision alignment modules 2 onto a vision component 11 of an eyewear 1 is performed. This first step is illustratively shown in FIG. 6a, whereby an outwardly-facing surface of the vision component 11 of the eyewear 1 is adhered with the vision alignment modules 2. Preferably, the adhesion surface 22 of the second surface of each vision alignment module 2 allows for the adherence of the vision alignment module 2 to the vision component 11 of an eyewear 1. Preferably as well, in this step, the vision alignment modules 2 adhere to roughly estimated locations along the vision component 11 where the eyes of the user are adjacent thereto.

In a second step of the example method, the step of wearing the eyewear 1, having the vision alignment modules 2 adhered thereto, by the user, is performed.

Figure 6A:
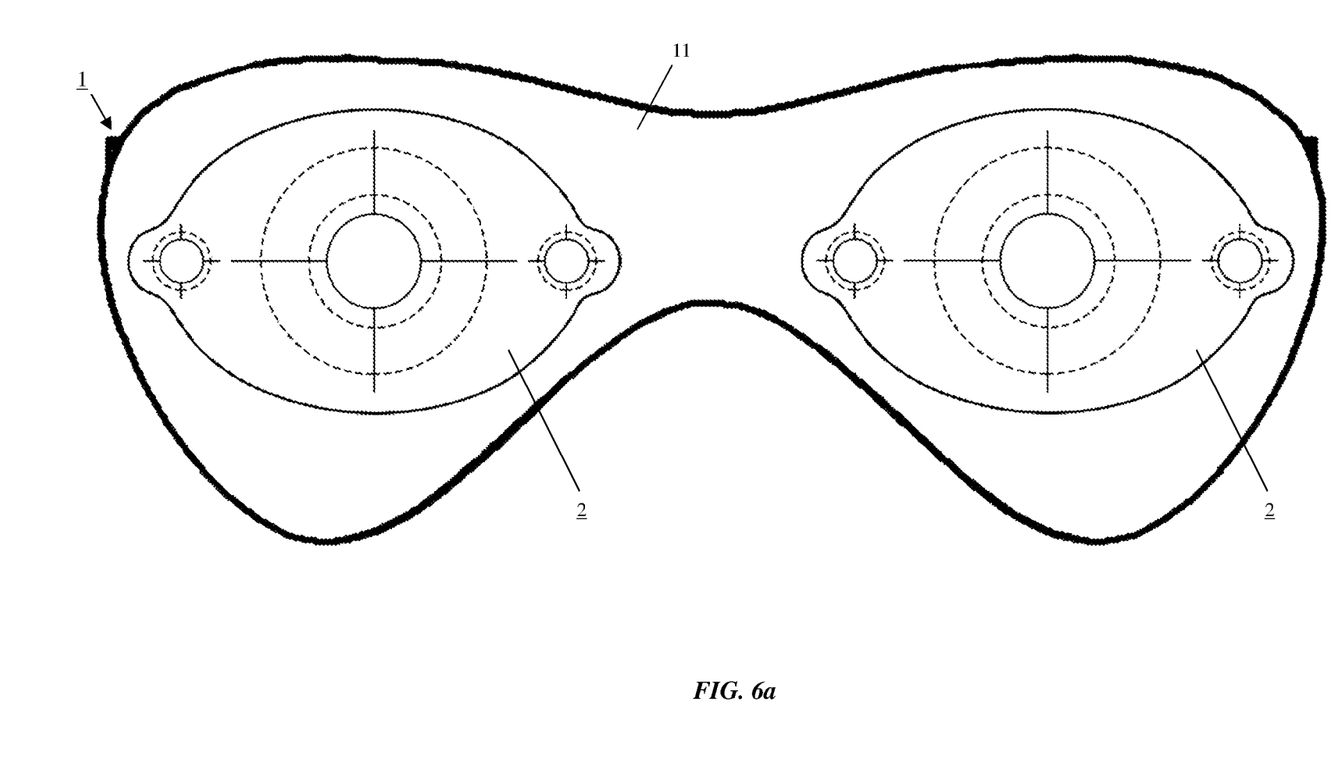
FIG. 6a illustrates a front view of a vision component of an eyewear adhered with the vision alignment modules.

In a third step of the example method, the step of adjusting the position of each vision alignment modules 2 for the first locator 21a to be aligned to a pupil of a user, is performed. This is for pupils of a user along the vision component 11 to be located. In particular, during this step, the eyewear 1 is worn by the user. In particular as well, during this step, the positions of the vision alignment modules 2 along the vision component 11 are adjusted by them being made to slide along the surface of the vision component 11.

Figure 6B:
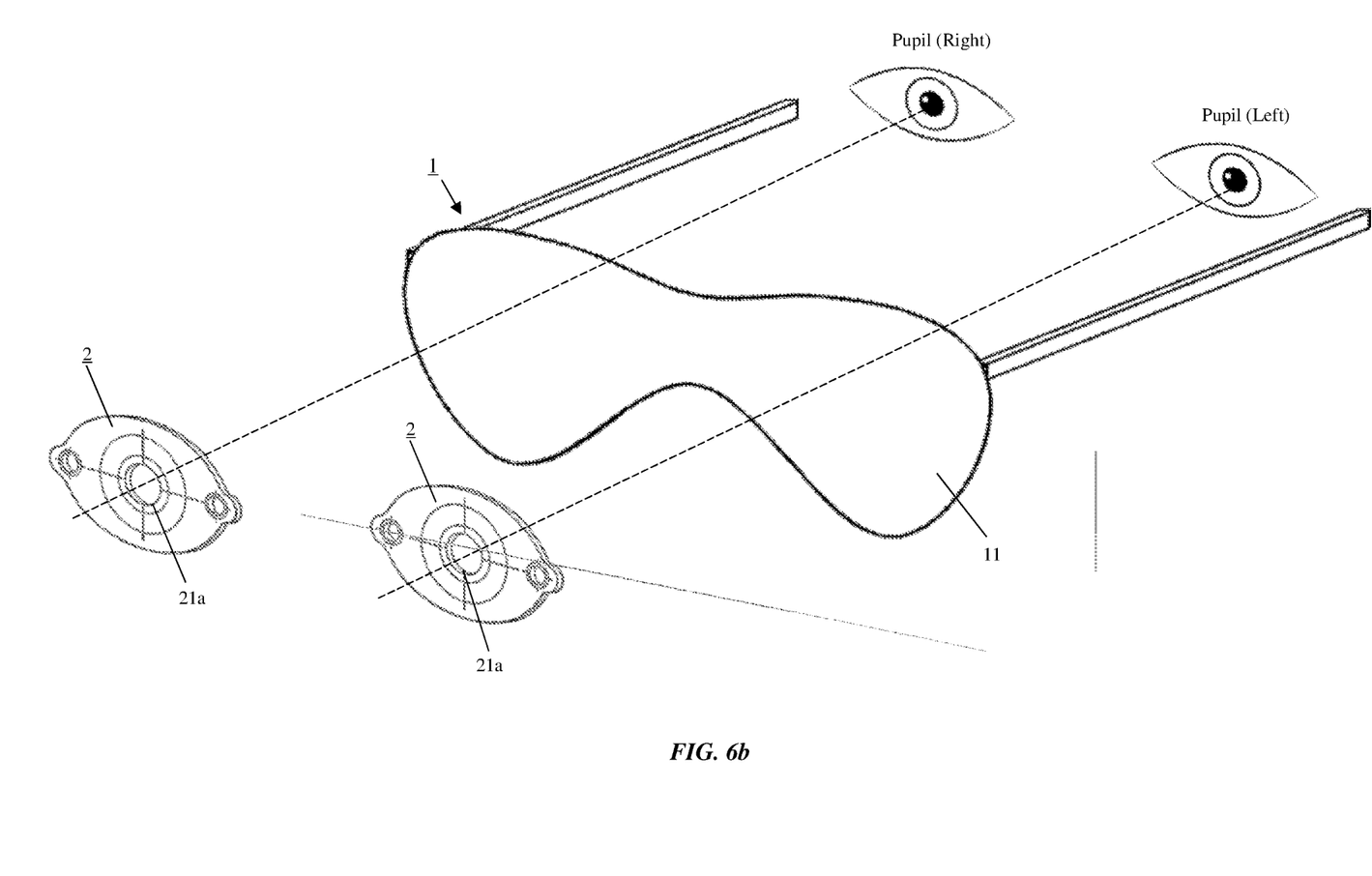
FIG. 6b illustrates a diagram where the line of sight of each pupil of the user is to align to corresponding first locators of the vision alignment modules that are adhered to the eyewear.

More specifically, the third step of the example method may further comprise one or more sub-steps. First, in a first sub-step, the user selects a fixation point, which may be an object that is a target of focus of the user. Next, in a second sub-step, the user closes one of their eyes, by way of example, their left eye, while their right eye remains open. Next, in a third sub-step, the user positionally adjusts the vision alignment module 2, which is substantially adjacent to the right eye, until the fixation point is fully seen by the right eye through the first locator 21a of the vision alignment module 2. With this, the first locator 21a of the vision alignment module 2 may now be considered to be aligned to the pupil of the right eye. These sub-steps are then repeated by the user, this time with their right eye closed and their left eye open, for the first locator 21a the vision alignment module 2 is adjacent to the left eye to be aligned to the pupil of the left eye. An illustrative depiction of the alignment of the pupils and the first locator 21a the vision alignment modules 2 is shown in FIG. 6b.

In a fourth step of the example method, the step of taking off the eyewear 1, by the user, is performed. It is noted that during this step, the vision alignment modules 2 remains adhered to the vision component 11, but it is now properly positioned for their first locators 21a to align to pupils of the user.

In a fifth step of the example method, the step of adjusting the position of each vision alignment modules 2 for it to be aligned to a reference, is performed. More specifically, the vision alignment modules 2 are adjusted by ensuring the reference lines on its first surface are aligned to a reference, which may be an imaginary reference, a marker that is part of the eyewear 1, and/or reference lines of each vision alignment modules 2. In particular, in this step, the vision alignment modules 2 are adjusted by being rotated so that the reference lines are substantially parallel and/or perpendicular to the reference while the position of the first locator 21a remains unchanged. Furthermore, in this step, the horizontal reference lines of one vision alignment module 2 may be made to align with reference lines of the other, and the vertical reference lines of one vision alignment module 2 may be made to be parallel with reference lines of the other. With this, skewness of the vision alignment modules 2 along the vision component 11 is reduced or eliminated.

Figure 6C:
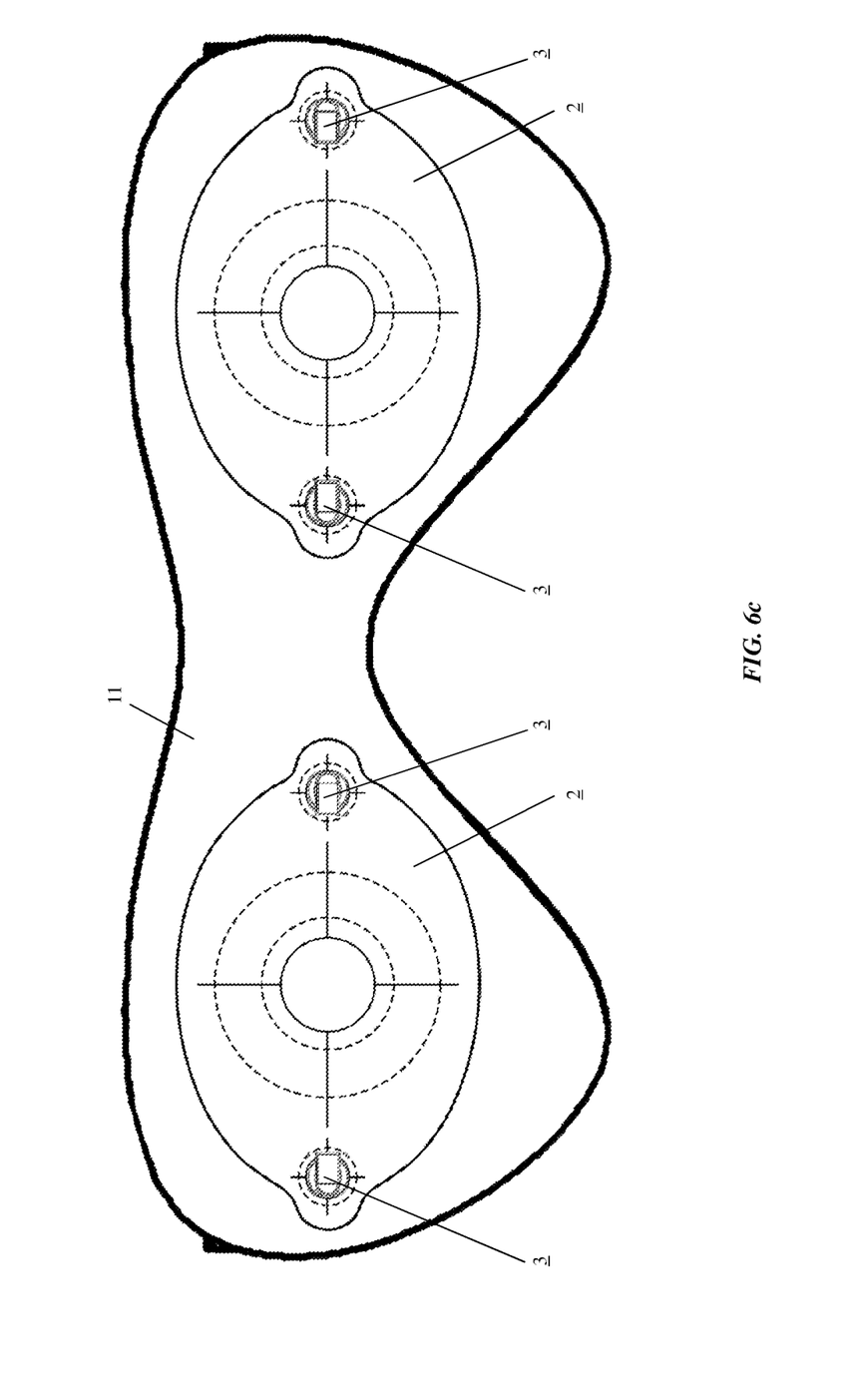
FIG. 6c illustrates a front view of the vision component of the eyewear adhered with the vision alignment modules and further attached with the mounting modules.

In a sixth step of the example method, the step of attaching the mounting modules 3 the vision component 11 of the eyewear 1 is performed. As per the previous step, the locations along the vision component 11 where the mounting modules 3 are to be attached have been indicated by the second locator 21b and the third locator 21c of the vision alignment modules 2. More specifically, the second locator 21b of the vision aligning module 2 has located a first location along the vision component 11 where one mounting module is to be attached or aligned thereto, and the third locator 21c of the vision aligning module 2 has located a second location along the vision component 11 where one mounting module is to be attached or aligned thereto. Preferably, the mounting modules 3 are to be attached without touching, or being in contact with, the vision alignment module 2. Moreover, mounting modules 3 may be attached by being pressed upon onto the vision component 11 for about 3 to 5 seconds. Preferably, the mounting modules 3 are mounted on the inward-facing surface of the vision component 11 after alignment with the second and third locators 21*b*, 21*c*. FIG. 6*c* illustrates the state of the eyewear 1 upon completion of this step. It is to be noted that the step of attaching the mounting modules 3 onto the vision component may differ based on their embodiments.

In the case where the mounting modules 3 are in the first embodiment 31 as shown in FIGS. 3*a* and 3*b*, their release films 311*a* are removed for their bonding layer 311 to bond to the locations along the vision component 11 indicated by or aligned with the second locator 21*b* and the third locator 21*c* of the vision alignment modules 2.

In the case where the mounting modules 3 are in the second embodiment 32 as shown in FIGS. 4*a* to 4*g*, their bonding unit 321 are made to press against the locations along the vision component 11 indicated by or aligned with the second locator 21*b* and the third locator 21*c* of the vision alignment modules 2. With this, a negative pressure is induced within the bonding unit 321, and the mounting modules 3 become bonded to their respective locations.

Figure 6D:
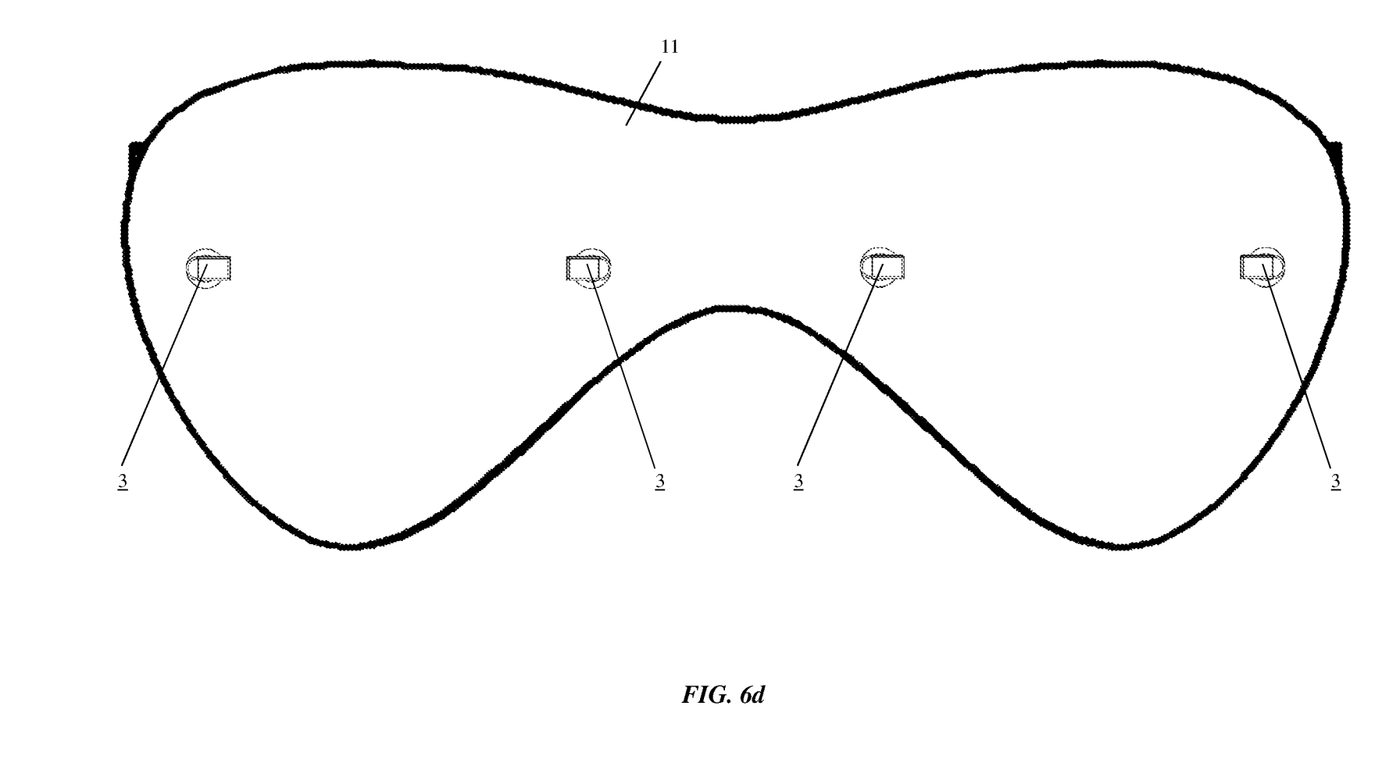
FIG. 6d illustrates a front view of the vision component of the eyewear with only the mounting modules after removal of the vision alignment modules.

In a seventh step of the example method, the step of removing the vision alignment module 2 from the vision component 11 of the eyewear 1, is performed. In particular, the vision alignment module 2 is removed by being peeled away, and the mounting modules 3 are to remain attached to the vision component 11 during this step. FIG. 6*d* illustrates the state of the eyewear 1 upon completion of this step.

Figure 6E:
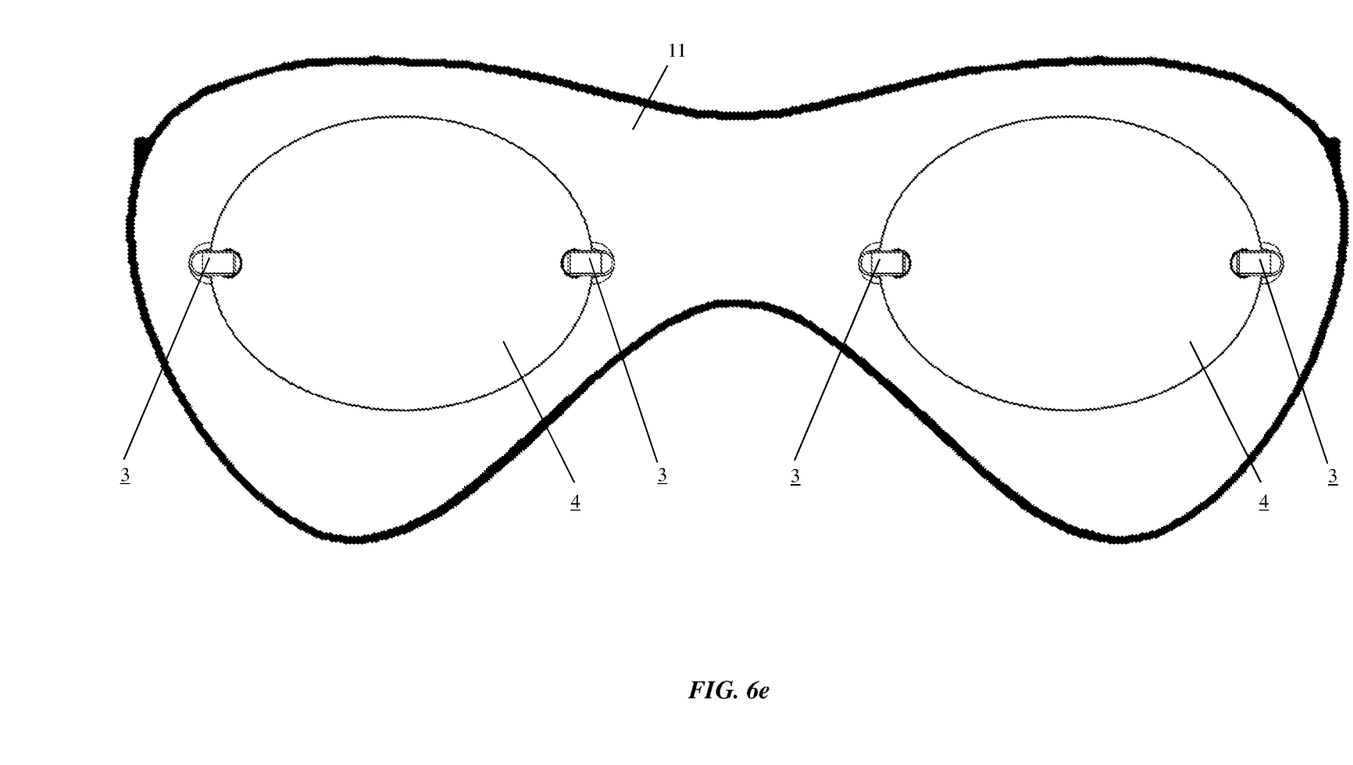
FIG. 6e illustrates the vision component of the eyewear mounted with lens modules via the mounting modules.

In an eighth step of the example method, the step of attaching the lens module 4 onto the mounting modules 3 is performed. More specifically, as attractor unit 4*b* of the lens modules 4 is made to be adjacent to the mounting modules 3, the lens modules 4 may substantially snap on or stick to the mounting modules 3, due to the attractive forces between the attractor unit 4*b* of the lens module 4 and the attractor units of the mounting modules 3. FIG. 6*e* illustrates the state of the eyewear 1 upon completion of this step. With this, the vision component 11 of the eyewear 1 is now detachably mounted with lens modules 4, via mounting module 3, which provides vision correction to a user wearing the eyewear 1.

As a result of performing the above steps, for example, the third step to the fifth step, during the eighth step, as the user wears the eyewear 1, the optical centre of the lens modules 4 are aligned to the pupils of the user, thereby ensuring maximum viewability of the user through the lens modules 4.

Regarding the eighth step of the example method, the mounting of the lens modules 4 onto the vision component 11 of the eyewear 1 via the mounting modules 3 may differ based on their embodiments of the mounting modules 3.

In the case where the mounting modules 3 are in the first embodiment 31 as shown in FIGS. 3*a* and 3*b*, the lens modules 4 are made to be adjacent to the mounting modules 31 for it to substantially snap on or stick to the mounting modules 31 through the attractive forces between the attractor units of the lens module 4 and the attractor units 312 of the mounting modules 31. Preferably, the attractor unit 4*b* of the lens module 4 may have a magnetic polarity that is opposite of the attractor units 312 of the mounting modules 31 for ensuring an attractive magnetic force between them. Preferably as well, the strength of the attractive magnetic force is substantial to a degree that the lens module 4 remains mounted to the mounting modules 31 during the bodily movements of the user.

In the case where the mounting modules 3 are in the second embodiment 32 as shown in FIGS. 4*a* and 4*g*, the lens module 4 is made to be adjacent to the mounting modules 32 with portions of the lens unit being slid in-between the arms of the gripper structure 322 for it to be snugly fitted therebetween. Then, the lens module 4 substantially snaps onto or sticks to the mounting modules 32 through the attractive forces between the securing means of the lens module 4 and the attractor units 3221, 3222 of the mounting modules 32. Preferably, the attractor unit 4*b* of the lens module 4 may have a magnetic polarity that is opposite of the attractor units 3221, 3222 of the mounting modules 31, for ensuring an attractive magnetic force between them. By way of example, a north pole of the attractor unit 4*b* of the lens module 4 is attracted to a south pole of the first attractor unit 3221 of the mounting module 32, and a south pole of the attractor unit 4*b* of the lens module 4 is attracted to a north pole of the second attractor unit 3222 of the mounting module 32. By way of yet another example, a south pole of the attractor unit 4*b* of the lens module 4 is attracted to a north pole of the first attractor unit 3221 of the mounting module 32, and a north pole of the attractor unit 4*b* of the lens module 4 is attracted to a south pole of the second attractor unit 3222 of the mounting module 32. Preferably as well, the strength of the attractive magnetic forces is substantial to a degree that the lens module 4 remains mounted to the mounting modules 32 during the bodily movements of the user.

In regards to the detachment of the lens module 4 from the mounting modules 3, an external force may be applied by the user to overcome the attractive magnetic forces between the attractor units of the lens modules 4 and the attractor units of the mounting modules 3. In the case where the mounting module 3 of the second embodiment 32, there is a further need to free the lens modules 4 from the arms of the gripper structure 322 after overcoming the magnetic forces.

In regards to the detachment of the mounting modules 3 from the vision component 11 of the eyewear 1, an external force may be applied by the user to overcome the bonding between the bonding layer/bonding unit of the mounting module 3 and the surface of the vision component 11 of the eyewear 1. The mounting modules 3 may remain attached on the vision component 11, as the mounting modules 3 do not obstruct vision of the user looking through the vision component 11.

Thus concludes the example method for ophthalmology carried out using the kit for ophthalmology.

It is to be noted that, in certain embodiments, the kit for ophthalmology may only include the set of vision alignment modules 2 and the set of mounting modules 3.

It is to be noted that, in certain embodiments, the kit for ophthalmology may further include lens handlers for handling the attachment of the lens modules 4 with the mounting modules 3 for their mounting onto the eyewear. Preferably, the lens handlers are in the form of suction cups, which are each to temporarily attach to one lens modules 4 to serve as a handling intermediary between the lens module 4 and the user. This shall allow the user to avoid direct contact with the lens modules 4 when they are mounted onto the eyewear via mounting modules 3 in a simple and convenient manner. With this, scratching of the lens modules 4 is prevented. After mounting of the lens modules 4, the lens handlers are detached therefrom. Similarly, the lens handlers may be used to handle the detachment of the lens modules 4 from the mounting modules 3.

With this, the details pertaining to a kit for ophthalmology and its method of use have been elucidated. The underlying principles of the present invention may be further applied for use in a broad range of vision-based devices and products having lens modules that may not necessarily provide vision correction.

The present disclosure includes the appended claims and the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention. For example, dimension D is given in a range of substantially 40 to 50 mm; it is possible that dimension D is selected and predetermined according to a type of the eyewear 1, so that stocking of the lens units 4, 411, 421 is provided in a selected range.

What is claimed is:

1. A kit for ophthalmology, comprising:
    a set of vision alignment modules for adhering to at least one vision component of an eyewear; and
    a set of mounting modules for attaching to the vision component;
    wherein the set of vision alignment modules are removably adhered to the vision component in a way to locate pupils of a user along the vision component, and locate locations along the vision component where the mounting modules are to be attached thereto before the vision alignment modules are removed from the vision component;
    wherein at least one of the vision alignment modules further comprises a plurality of reference lines for positioning of the vision alignment module along the vision component as it adheres thereto.

2. The kit according to claim 1, wherein at least one of the vision alignment modules comprises:
    a first locator for locating one pupil of the user along the vision component as the eyewear is worn;
    optionally, a second locator for locating a first location along the vision component where one mounting module is to be attached thereto; and
    optionally, a third locator, for locating a second location along the vision component where one mounting module is to be attached thereto.

3. The kit according to claim 2, wherein at least one of the vision alignment modules further comprises an adhesion surface to enable adherence to the vision component in a detachable manner.

4. The kit according to claim 1, further comprising a set of lens modules that are mounted onto the vision component via the mounting modules.

5. The kit according to claim 4, wherein at least one of the lens modules comprises:
    a lens unit defined with one or more slots; and
    one or more attractor units, which are inserted into the slots to enable the lens module mounted onto the vision component via the mounting module.

6. The kit according to claim 5, wherein the lens modules each further comprises sleeves that sleeve the attractor units of the lens module for frictional contact between the said attractor units and the slots of the lens unit as the said attractor units are inserted into the slots.

7. The kit according to claim 5, wherein the attractor units are magnets or magnetic devices.

8. The kit according to claim 4, wherein at least one of the mounting modules comprises:
    a bonding layer for enabling attachment of the mounting module to the vision component via adhesion; and
    an attractor unit for enabling attachment of the lens module, or portions thereof, onto the mounting module for mounting of the lens module onto the vision component via the mounting module.

9. The kit according to claim 4, wherein at least one of the mounting module comprises:
    a bonding unit for enabling attachment of the mounting module to the vision component via negative pressure; and
    a gripper structure having a pair of attractor units for enabling attachment of the lens module, or portions thereof, onto the mounting module for mounting the lens module onto the vision component via the mounting module.

10. A method for ophthalmology, comprising the steps of:
    adhering each vision alignment module from a set of vision alignment modules onto a vision component of an eyewear; and
    attaching each mounting module from a set of vision alignment modules onto the vision component;
    wherein at least one of the vision alignment modules adheres to the vision component in a way to locate pupils of a user along the vision component, and locate locations along the vision component where the mounting modules are to be attached thereto before the vision alignment modules are removed from the vision component;
    wherein at least one of the vision alignment modules further comprises a plurality of reference lines for positioning of the vision alignment modules as it adheres to the vision component.

11. The method according to claim 10, wherein at least one of the vision alignment modules comprises a first locator, for locating one pupil of the user along the vision component as the eyewear is worn.

12. The method according to claim 11, further comprising the step of adjusting the position of each vision alignment module for the first locator to be aligned to one pupil of the user, for pupils of a user along the vision component to be located.

13. The method according to claim 12, wherein the position of each vision alignment module is adjusted to be aligned to a reference based on the reference lines on the vision alignment module.

14. The method according to claim 10, further comprising the step of mounting each lens module from a set of lens modules onto the vision component via the mounting modules.

15. The method according to claim 14, further comprising the step of inserting one or more attractor units into slots of a lens unit of one lens module, to enable the step of mounting each lens module from a set of lens modules onto the vision component via the mounting modules.

16. The method according to claim 15, wherein the attractor units are magnets or magnetic devices.

17. The method according to claim 14, further comprising the steps of:
    attaching the mounting module to the vision component, via adhesion, by a bonding layer of the mounting module; and
    attaching the lens module, or portions thereof, onto the mounting module by an attractor unit of the mounting module.

18. The method according to claim 14, further comprising the steps of:

attaching the mounting module to the vision component, via negative pressure, by a bonding unit of the mounting module; and attaching the lens module, or portions thereof, onto the mounting module by a gripper structure of the mounting module, which has a pair of attractor units.

19. A kit for ophthalmology, comprising:

a set of vision alignment modules for adhering to at least one vision component of an eyewear; and a set of mounting modules for attaching to the vision component;

wherein the set of vision alignment modules are removably adhered to the vision component in a way to locate pupils of a user along the vision component, and locate locations along the vision component where the mounting modules are to be attached thereto before the vision alignment modules are removed from the vision component;

wherein at least one of the vision alignment modules comprises:

a first locator for locating one pupil of the user along the vision component as the eyewear is worn;

a second locator for locating a first location along the vision component where one mounting module is to be attached thereto; and optionally, a third locator, for locating a second location along the vision component where one mounting module is to be attached thereto.

* * * * *